United States Patent
O'Connor et al.

(10) Patent No.: US 9,699,256 B2
(45) Date of Patent: Jul. 4, 2017

(54) SYSTEM AND METHOD FOR DYNAMIC SUGGESTION OF OPTIMAL COURSE OF ACTION

(71) Applicant: Avaya Inc., Basking Ridge, NJ (US)

(72) Inventors: Neil O'Connor, Galway (IE); Paul D'Arcy, Limerick (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 13/629,898

(22) Filed: Sep. 28, 2012

(65) Prior Publication Data

US 2014/0095681 A1    Apr. 3, 2014

(51) Int. Cl.
*G06F 15/173* (2006.01)
*H04L 29/08* (2006.01)
*G06F 9/54* (2006.01)
*G06Q 30/04* (2012.01)

(52) U.S. Cl.
CPC .......... *H04L 67/18* (2013.01); *H04L 67/1091* (2013.01); *G06F 9/542* (2013.01); *G06Q 30/04* (2013.01)

(58) Field of Classification Search
CPC .......... H04L 29/06027; H04L 65/1006; H04L 67/18; G06Q 10/0633; G06Q 10/06311; G06Q 30/0261
USPC ........................................................ 709/223
See application file for complete search history.

(56) References Cited

U.S. PATENT DOCUMENTS

| | | | |
|---|---|---|---|
| 8,463,939 B1* | 6/2013 | Galvin | H04L 65/1063 379/265.01 |
| 2006/0045030 A1* | 3/2006 | Bieselin | H04L 12/1845 370/260 |
| 2006/0126601 A1* | 6/2006 | Kim | H04L 67/16 370/352 |
| 2009/0210524 A1* | 8/2009 | McCormack et al. | 709/223 |
| 2010/0027778 A1* | 2/2010 | Kumar et al. | 379/265.09 |
| 2010/0169418 A1* | 7/2010 | Whynot | H04W 4/02 709/204 |
| 2010/0172480 A1* | 7/2010 | Lynch | G10L 15/26 379/88.04 |
| 2011/0194683 A1* | 8/2011 | Wilson | G06Q 10/109 379/202.01 |
| 2011/0202439 A1* | 8/2011 | Ricci | G06Q 30/04 705/32 |
| 2011/0209159 A1* | 8/2011 | Baratz et al. | 718/108 |
| 2011/0252132 A1* | 10/2011 | Wetzer | G06F 9/542 709/224 |

(Continued)

*Primary Examiner* — Ranodhi Serrao
*Assistant Examiner* — James Fiorillo

(57) ABSTRACT

A method of dynamically determining an optimal course of action for a user in an enterprise is provided. The method includes connecting a proxy to a complex event processing (CEP) engine to integrate the CEP engine with a communication framework of the enterprise, dynamically adding a user device into a communication framework of the enterprise based upon a user device location, determining contextual information related to the user from the communication framework of the enterprise, determining real time information related to the contextual information of the user from the communication framework of the enterprise, and determining an optimal course of action for the user based upon the contextual information and the real time information.

16 Claims, 3 Drawing Sheets

(56) References Cited

U.S. PATENT DOCUMENTS

| | | | | |
|---|---|---|---|---|
| 2012/0030289 A1* | 2/2012 | Buford | ................... | G06Q 10/10 |
| | | | | 709/205 |
| 2012/0039454 A1* | 2/2012 | Hobbs | ............... | H04M 3/42374 |
| | | | | 379/201.01 |
| 2012/0271921 A1* | 10/2012 | Gecer et al. | ................... | 709/219 |
| 2015/0295807 A1* | 10/2015 | Huang | ................. | H04L 43/062 |
| | | | | 709/224 |

* cited by examiner

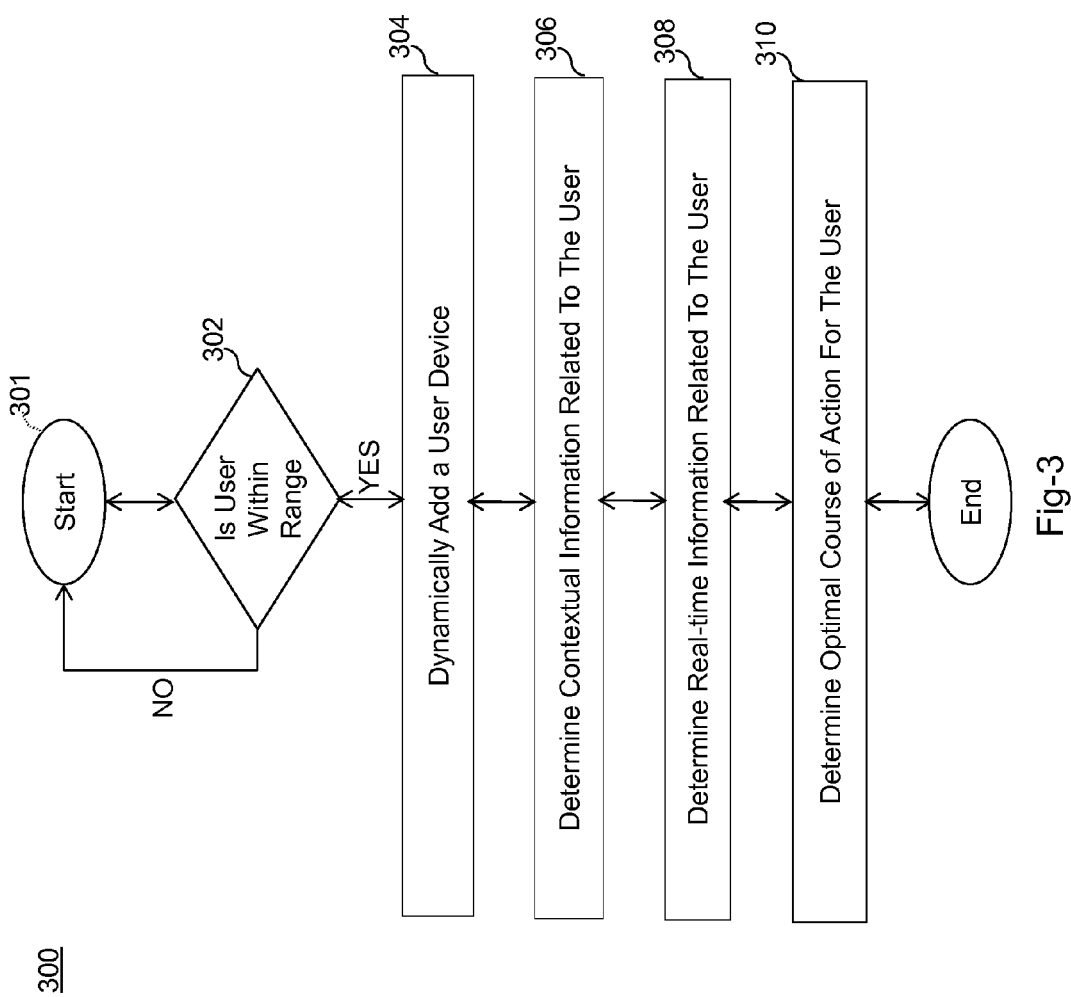

SYSTEM AND METHOD FOR DYNAMIC SUGGESTION OF OPTIMAL COURSE OF ACTION

BACKGROUND

Field of the Invention

Embodiments of the present invention generally relate to a system and method for enterprise communication frameworks and particularly to a system and method for dynamically suggesting an optimal course of action for a user in an enterprise.

Description of Related Art

Contact centers are typically part of a communication framework of many enterprises and are employed for servicing inbound and outbound contacts from customers. Further, the contact centers typically keep a record of various events and activities that may have occurred within the enterprise in the past or scheduled for the present or future. A typical contact center includes a server to receive and route incoming packet-switched and/or circuit-switched contacts and one or more resources, such as an employee or human agents, and automated resources (e.g., Interactive Voice Response (IVR) units), to service the incoming contacts. Contact centers distribute contacts, whether inbound or outbound, for servicing to any suitable resource according to predefined criteria.

Further, end-points inside the contact centers are typically statically configured within the communication framework. However, conventional communication frameworks of the enterprises and contact centers may provide the ability to share call control for a given end-point or a user device only when 'Invite' is sent to/from the configured endpoints. Hence, conventional communication frameworks provide a limited ability to dynamically offer rich services to temporal users.

Furthermore, conventional contact centers and communication frameworks of the enterprises lack the capability to suggest a suitable course of action to a user who has come to the enterprise after a break, or to a user who has temporally come to an office of the enterprise.

Further, complex event processing (CEP) engines are typically employed by many enterprises to identify patterns of events or relationships between events, and a suggested course of action based on input information. The CEP engine may receive one or more input streams of information from any of a variety of information sources, monitor the input stream for presence of certain information, and then publish data onto one or more output streams relating to some type of processing or analysis of the input stream if the CEP engine determines one or more events have occurred based on certain information in the input stream. Various types of data may be published onto input streams having a variety of formats for inputting to the CEP engine. Likewise, data published onto output streams may have a variety of formats.

In CEP, a set of queries and rules are defined by an administrator of the CEP engine that the CEP engine uses to process and analyze the input stream to determine if one or more events have occurred. The CEP engine receives the incoming data from various data sources and applies the queries and rules defined by the administrator to the incoming data to determine if events have occurred. For example, some queries may belong to IF-THEN conditional statements or SQL-type pattern-match queries that define if some event has occurred. The CEP engine are further capable of providing optimized procedures for handling certain eventualities subject according to pre-configured rules.

There is thus a need for a communication framework of an enterprise that can provide real time information in addition to historical information related to a user to a CEP engine and that can dynamically suggest an optimal course of action for the user.

SUMMARY

These and other needs are addressed by the various embodiments and configurations of the present invention. Embodiments of the present invention are directed generally to a system and method for determining an optimal course of action for a user in an enterprise.

In one embodiment, an enterprise communication system is provided. The enterprise communication system includes a contact center and a complex event processing (CEP) engine. The CEP engine is connected to the contact center through a proxy. Further, the contact center includes a context engine and a communication framework. The context engine is configured to determine contextual information related to a user. The communication framework is configured to determine real time information related to the user device. The CEP engine is configured to determine an optimal course of action for the user based upon the contextual information and the real time information.

In another embodiment, a method of dynamically determining an optimal course of action for a user in an enterprise is provided. The method includes connecting a proxy to a complex event processing (CEP) engine to integrate the CEP engine with a communication framework of the enterprise, dynamically adding a user device into a communication framework of the enterprise based upon a user device location, determining contextual information related to the user from the communication framework of the enterprise, determining real time information related to the user from the communication framework of the enterprise, and determining an optimal course of action for the user based upon the contextual information and the real time information.

Embodiments of the present invention provide a number of advantages depending on the particular configuration. First, one embodiment provides connection of a SIP Proxy to a Complex Event Processing (CEP) engine to enable real-time data from contacts of a contact center to be employed in the CEP making recommendations. Further, an embodiment of the present invention integrates the CEP engine with a contact center, so recommendations could be used directly to alter the operation or configuration of the contact center. Furthermore, an embodiment of the present invention advantageously facilitates using historical information in combination with real time information for determining optimal course of action for the user.

These and other advantages will be apparent from the disclosure of embodiments of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, wherein like reference numerals in the various figures are utilized to designate like components, and wherein:

FIG. 3 is a flowchart depicting a method for determining an optimal course of action for a user in an enterprise according to an embodiment of the present invention.

Figure 1:
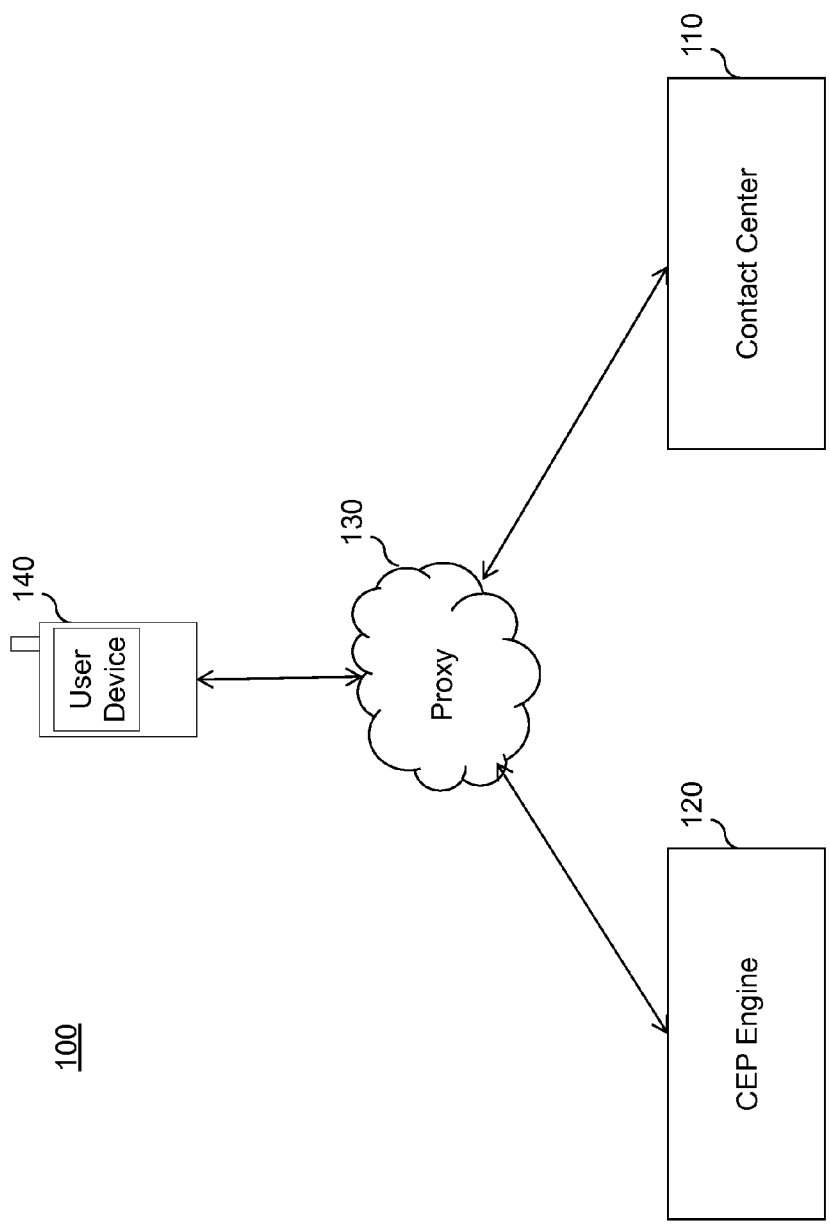
FIG. 1 is a block diagram depicting a CEP server and a contact center connected through a proxy, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be described in conjunction with an exemplary communication system. Although well suited for use with, e.g., an enterprise communication system, the present invention is not limited to any particular type of communication system or configuration of system elements. Those skilled in the art will recognize the disclosed techniques may be used in any communication application in which it is desirable to provide improved data processing.

FIG. 1 shows an illustrative embodiment of the present invention. An enterprise communication framework 100 includes a contact center 110 and a complex event processing (hereinafter referred as "CEP") engine 120.

Further, the CEP engine 120 may be connected with a proxy 130. In an embodiment, the proxy 130 may be a SIP proxy. In another embodiment, the proxy 130 may include multiple proxies for each office of a particular enterprise, in case the enterprise includes multiple offices across different geographical regions. In one embodiment, the connection of the CEP engine 120 with the proxy 130 may integrate the CEP engine with the contact center 110 of the enterprise.

The enterprise communication framework 100 further includes a user device 140. In one embodiment, the user device 140 may be connected to the contact center 110 and the CEP engine 120 through the proxy 130. In an embodiment, the user device may be a mobile phone. In another embodiment, the user device may include but not limited to any smart phone, tablet, laptop, iPad, or any other mobile and/or wireless device, and the like.

The CEP engine 120 may receive information related to a user from the contact center 110 via the proxy 130. The information related to the user may include historical information, contextual information, and real-time information related to the user or some other general information related to the enterprise. The CEP engine 120 may be configured to process and analyze the information received related to the user from the contact center 110. The CEP engine 120 may be further configured to determine optimal course of action to a user based upon the contextual information and the real-time information related to the user, according to predefined rules.

The CIP engine 120 may send the user device 140 the optimal course of action for the user through the proxy 130. The user may accept the received optimal course of action and take suitable action.

Further, in an embodiment, the CEP engine may include an application that is a sequenced application for endpoints including the user device 140. The CEP engine is sequenced for all relevant SIP messages, including NOTIFY and INVITE.

In an embodiment, the CEP engine may be a server having a processor, a memory, storage devices and I/O devices. In another embodiment, the CEP engine may include one or more processors, memory, software and/or other associated devices to perform CEP.

Figure 2:
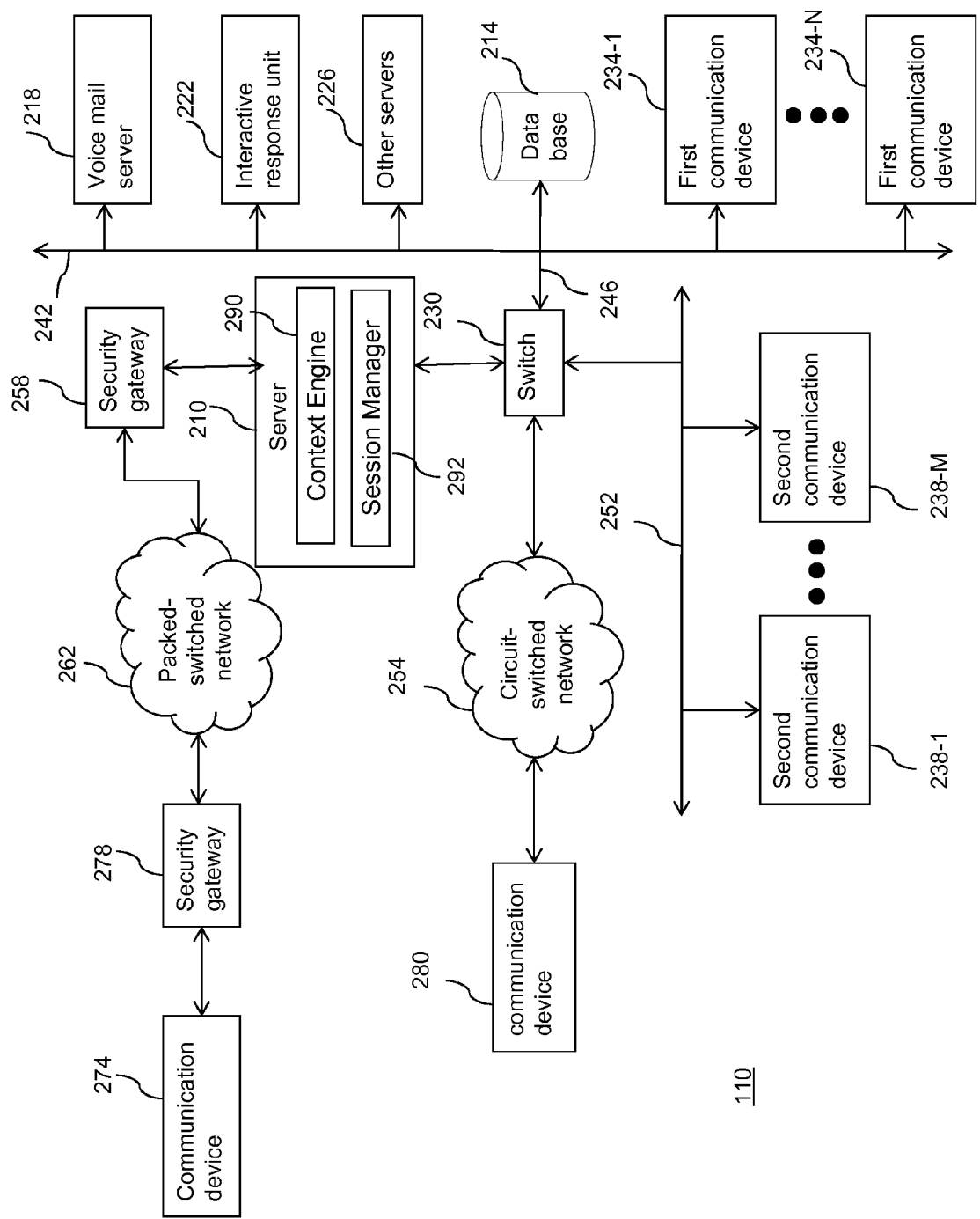
FIG. 2 is a block diagram depicting a contact center according to an embodiment of the present invention.

The detail of the contact center 110 is discussed in conjunction with description of FIG. 2.

FIG. 2 shows an illustrative embodiment of the contact center 110. The contact center 110 comprises a central server 210, a set of data stores or databases 214 containing contact, users, employees or customer related information and other information that can enhance the value and efficiency of the contact processing, and a plurality of servers, namely a voice mail server 218, an Interactive Response unit (e.g., IVR) 222, and other servers 226, a switch 230, a plurality of working employees (or agents, users etc.) operating packet-switched (first) communication devices 234-1 to N (such as computer work stations or personal computers), and/or circuit-switched (second) communication devices 238-1 to M, all interconnected by a local area network LAN (or wide area network WAN) 242. The servers can be connected via optional communication lines 246 to the switch 230. As will be appreciated, the other servers 226 can also include a scanner (which is normally not connected to the switch 230 or Web server), VoIP software, video call software, voice messaging software, an IP voice server, a fax server, a web server, an email server, and the like. The switch 230 is connected via a plurality of trunks 250 to the Public Switch Telephone Network or PSTN 254 and via link(s) 252 to the second communication devices 238-1 to M. A gateway 258 is positioned between the server 210 and the packet-switched network 262 to process communications passing between the server 210 and the network 262.

Although an embodiment is discussed with reference to a client-server architecture, it is to be understood that the principles of the present invention apply to other network architectures as well. For example, embodiments of the present invention include peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

The gateway 258 can be Avaya Inc.'s, G700 Media Gateway™ and may be implemented as hardware such as via an adjunct processor or as a chip in the server.

The first communication devices 234-1, . . . 234-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 238-1, . . . 238-M are circuit-switched. Each of the communication devices 238-1, . . . 238-M corresponds to one of a set of internal extensions Ext1, . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that embodiments of the present invention do not require any particular type of information transport medium between switch or server and first and second communication devices, i.e., embodiments of the present invention may be implemented with any desired type of transport medium as well as combinations of different types of transport channels.

The packet-switched network 262 can be any data and/or distributed processing network, such as the Internet. The network 262 typically includes proxies, registrars, and routers for managing packet flows.

The packet-switched network 262 is in communication with a first communication device 274 via a gateway 278, and the circuit-switched network 254 with an external second communication device 280.

In one configuration, the server 210, network 262, and first communication devices 234-1 through 234-N are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 2 is for purposes of illustration only and should not be construed as limiting the present invention to any particular arrangement of elements.

According to at least one embodiment, a context engine 290 and a session manager 292 are provided. The context engine 290 and the session manager 292 may be software modules or instructions or programs that are stored either in the main memory or in a peripheral memory (e.g., disk, CD ROM, etc.) or some other computer-readable medium of the center 100.

The context engine 290 monitors employees, customers, users etc. of the enterprise and their various activities inside the enterprise, rules, and policies related to the enterprise. As will be appreciated, the central server 210 is notified via LAN 242 of an incoming contact by the communications component (e.g., switch 230, fax server, email server, web server, and/or other server) receiving the incoming contact. The context engine 290 also forwards user-related contextual information from databases 214 to the CEP engine. The databases 214 may include historical information related to various users, customers and the like and other activities of the enterprise.

The session manager 292 keeps a record of the user devices currently available into the enterprise communication framework and their location into the enterprise. The session manager 292 may forward this real-time information to the CEP engine 120.

The operation of the contact center 110 and the CEP engine 120 will now be discussed with reference to FIG. 3.

In step 302, it is determined if a user device 140 is within range of an enterprise communication framework. If the user device is within range of the enterprise communication framework, the method 300 proceeds to 302. Otherwise, the method 300 returns to Start 301.

In step 304, the session manager 292 dynamically adds the user device in the communication framework of the enterprise. In one embodiment, the session manager 292 adds the user device in the communication framework of the enterprise based upon a location of the user device 140. If the user device is present within the range of the communication framework of the enterprise, the session manager may automatically add the user device in the communication framework of the enterprise.

For example, if the user device 140 is within the enterprise, the user device 140 may be automatically connected to the communication framework of the enterprise. However, if the device 140 is at user's home, it may be out of range of the communication framework of the enterprise, and hence it may not be connected to the communication framework of the enterprise. In that case, the user device 140 may not use communication infrastructure provided by the enterprise. Hence, depending upon location of the user device 140, the user device 140 may join or leave the communications infrastructure of the enterprise.

In an embodiment, the user device 140 may belong to an employee of the enterprise. The session manager 292 may automatically add such user devices 140 in the network or communication framework of the enterprise.

In step 306, the context engine 290 may determine contextual information related to the user device 140. The context engine 290 may retrieve contextual information related to the user device from the databases 214 of the contact center 110. In an embodiment, the context engine 290 may retrieve the contextual information based upon identification information of the user device 140 including, but not limited to, a user phone number, employee ID, or some other personal detail. In another embodiment, the context engine 290 may retrieve the contextual information from the database 214, based upon predefined rules. The context engine 290 may provide the contextual information related to the user to the CEP engine 120.

In step 308, the session manager 292 provides real time information related to user devices 140 and users, customers, and employees of the enterprise. The session manager 292 may have a record of online or logged users present inside the communication framework of the enterprise. The session manager 292 may forward such records to the CEP engine 120.

In step 310, the CEP engine 120 processes and analyzes the received contextual information and the real time information. Based on the analysis, the CEP engine 120 may determine an optimal course of action for the user. The CEP engine 120 may provide the optimal course of action to the user device 140. In one embodiment, the optimal course of action may include scheduling a meeting of the user with some other user, who is present in the communication framework of the enterprise.

In another embodiment, the CEP engine 120 may also utilize information from various sources or databases part from contact center 110, in the determination of the optimal course of action for the user.

Further, a user of the user device 140 may decide to follow the optimal course of action suggested by the CEP engine 120. In an embodiment, the user may accept a meeting with another user. In another embodiment, the user may alter the operation or configuration of the contact center 110 based upon the received optimal course of action.

Furthermore, the session manager 292 may remove the user device 140 from the communication environment of the enterprise based upon the location of the user. For example, if the user has gone outside the premise or communication framework of the enterprise, the session manager 292 may automatically terminate the connection of the user device 140 with the communication framework of the enterprise.

Examples will now be discussed to illustrate the above principles. The following examples illustrate working of the present invention in accordance with an embodiment of the present invention. A person of ordinary skilled in the art will appreciate that the present invention may be performed within any enterprise and is not limited to any particular enterprise or communication framework of the enterprise.

Example 1

A regional manager of a Contact Center operator is visiting operations sites of an enterprise, and is carrying a mobile device, for example, an iPad with a suitable client installed. Further, the CEP engine 120 is connected through the proxy 130, and is integrated with the enterprise communication framework.

As the manager enters site 1 of the enterprise, the mobile device may display a problem key performance indicator (KPI) trend that was discussed with Supervisor A few days before. The CEP engine 120 may display suggested courses of action for the manager on this visit. For example, as the CEP engine 120 has already identified that Supervisor A is currently on a break, the display suggests clicking to discuss one of the company's business processes with an administrator, because of an exception in the duration of time it took to make the contact center configuration change. The administrator has already been identified as available by the CEP engine 120 and in the server room of the enterprise at the moment.

Further, other intelligent suggested courses of action may also be available to the manager, and have been pre-calculated. For example, the manager's mobile device may also offer an option to click to bring up the current status of the problem KPI, and arrange a short discussion with agents who have been handling relevant calls. All necessary resources have been pre-calculated, the context is current and relevant, and the manger simply needs to click to execute on a preferred option to optimize the use of time for the visit to the site.

Furthermore, the manager may continue to site 2, in order to meet with Supervisor B for a general update on operations. The manager may not be aware that site 2 experienced a short outage the previous month, due to a faulty 3rd party router. The mobile device may change display automatically, showing the root cause of the outage and the measured response time. Fortuitously present at the site at this time, also happens to be a member of the IT supplier.

The manager can see that scheduled maintenance is taking place, and is offered a meeting with the IT supplier who happens to be on site, and the in-house technician who dealt with the previous outage. Hence, the manager may discuss an incident with relevant parties to ensure the correct procedures are in place.

The manager makes a single click to accept the opportunity to have such as discussion arranged and also defer the meeting with the supervisor to 1 hour later.

Example 2

A senior police officer is arriving for a meeting with the Commissioner. The meeting may have the following agenda to be discussed, for example, crime rate in sector X must be reduced, regularization of over-spending police car maintenance budget, and need to foster good relations with the newly elected mayor's office.

The police officer has arrived early for the meeting. The mobile device of the police officer, being aware of this, may provide a menu of courses of action that may be possible at that time, based upon contextual information and real time information. The user may then select a preferred course of action. A pre-calculation may be made related to one or more of the menu items, in order to facilitate execution of the selected course of action. For example, if human or other resources in the enterprise need to be reserved or obtained to execute the selected option, the reserving or obtaining will be transparent to the user.

For example, the mobile device of the police officer may have found that some of the police inspectors responsible for sector X are in the building already. It has identified a suitable location for a sidebar talk, pulled down the latest crime trend, and is offering to complete the arrangement of the impromptu meeting with a click.

Further, the mobile device may provide a summary of latest tender deals being offered by approved suppliers of vehicle maintenance for the police department. The statistics may show that this police officer's maintenance budget spend is actually in good shape, but one new car has been requested by the precinct, and a slot with the commissioner's budget manager available that morning. The mobile device may suggest getting signoff on that new car for being under the maintenance budget.

Furthermore, the context engine 290 may acquire contextual information from public information sources, such as newspapers, business information databases, etc. For example, context engine 290 may have retrieved a newspaper article from that morning, with an article from the mayor in which he says that engagement with school-going children is the key to improving health, environmental awareness and crime levels. The mobile device has pulled the visit schedule made by the officer's precinct in local schools year-to-date, showing a correlation between these visits and community satisfaction surveys. Also, the mobile device has pulled off the decision that his budget for community officers has been cut. Hence, the mobile device may suggest asking the commissioner at today's meeting to re-instate the budget.

The exemplary systems and methods of embodiments of the present invention have been described in relation to a contact center. However, to avoid unnecessarily obscuring aspects of the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein and as described in connection with the various embodiments.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the invention can be used. It would be possible to provide for some features of the present invention without providing others.

For example in one alternative embodiment, the systems and methods of embodiments of the present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this invention. Exemplary hardware that can be used for embodiments of the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of embodiments of the present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although embodiments of the present invention describe components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in embodiments of the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of dynamically determining an optimal course of action for a user of a user device in an enterprise, the method comprising:

dynamically adding, by a server, the user device into an enterprise communication framework based upon the user device being within range of the enterprise communication framework;

retrieving, by the server, contextual information related to the user and to the user device based on identification information associated with the user device, wherein the contextual information related to the user comprises historical information retrieved from a data source internal to the enterprise communication framework;

determining, by the server, real-time information related to the user and to the user device, wherein the real-time information comprises a record of logged users present inside the enterprise communication framework;

forwarding, by the server, the contextual information and the real-time information to a complex event processing (CEP) engine, wherein the CEP engine comprises an application sequenced for session initiation protocol (SIP) messages;

fetching, by the CEP engine, external information from a data source external to the enterprise communication framework;

determining, by the CEP engine, an optimal course of action for the user of the user device, wherein:

the CEP engine analyzes the contextual information, the external information, and the real-time information, to detect an occurrence of one or more conditions and to identify at least one correlation or pattern related to the one or more conditions: and the optimal course of action comprises an activity involving one or more additional users within range of the enterprise communication framework; and transmitting, by the CEP engine, the optimal course of action to the user device.

2. The method of claim 1, wherein the enterprise communication framework is integrated with the CEP engine.

3. The method of claim 2, wherein the enterprise communication framework is integrated with the CEP engine through a proxy.

4. The method of claim 3, wherein the proxy comprises a session initiation protocol (SIP) proxy.

5. The method of claim 1, wherein the contextual information related to the user further comprises information retrieved from a public information source.

6. The method of claim 1, wherein determining real-time information is based upon connection of a session initiation protocol (SIP) proxy to the CEP engine.

7. The method of claim 1, wherein the enterprise communication framework comprises a contact center of the enterprise.

8. The method of claim 1, wherein the optimal course of action comprises a menu of courses of action for the user.

9. The method of claim 1 further comprising dynamically removing, by the server, the user device from the enterprise communication framework based upon a user device location.

10. The method of claim 1, wherein the optimal course of action comprises scheduling a meeting with one or more additional users also within range of the enterprise communication framework.

11. An enterprise communication system for dynamically determining an optimal course of action for a user of a user device in an enterprise, the enterprise communication system comprising:
a first server comprising:
a first memory device storing first executable instructions; and
a first processor in communication with the first memory device, wherein the first processor when executing the first executable instructions:
dynamically adds the user device into an enterprise communication framework based upon the user device being within range of the enterprise communication framework;
retrieves contextual information related to the user and to the user device based on identification information associated with the user device, wherein the contextual information related to the user comprises historical information retrieved from a data source internal to the enterprise communication framework;
determines real-time information related to the user and to the user device wherein the real-time information comprises a record of logged users present inside the enterprise communication framework; and
forwards the contextual information and the real-time information to a complex event processing (CEP) engine; and
the CEP engine, comprising:
a second memory device storing second executable instructions; and
a second processor in communication with the second memory device, wherein the second processor when executing the second executable instructions:
executes an application sequenced for session initiation protocol (SIP) messages;
fetches external information from a data source external from the enterprise communication framework;
determines an optimal course of action for the user of the user device wherein:
the CEP engine analyzes the contextual information, the external information, and the real-time information to detect an occurrence of one or more conditions and to identify at least one correlation or pattern related to the one or more conditions: and
the optimal course of action comprises an activity involving one or more additional users within range of the enterprise communication framework; and
transmits the optimal course of action to the user device.

12. The enterprise communication system of claim 11, wherein the second processor when executing the second executable instructions determines the optimal course of action based upon predefined rules.

13. The enterprise communication system of claim 11, wherein the enterprise communication framework is coupled with the CEP engine through a session initiation protocol (SIP) proxy.

14. The enterprise communication system of claim 11, wherein the sequenced application is configured for SIP messages comprising one of 'notify' or 'invite'.

15. The enterprise communication system of claim 11, wherein the first processor when executing the first executable instructions determines the contextual information related to the user based upon predefined rules.

16. The enterprise communication system of claim 11, wherein the optimal course of action comprises scheduling a meeting with one or more additional users also within range of the enterprise communication framework.

* * * * *